United States Patent [19]
Pepmeier et al.

[11] 3,731,529
[45] May 8, 1973

[54] APPARATUS FOR DETERMINING COATING ADHESION PROPERTIES OF HYDROPHOBIC SURFACES

[75] Inventors: Carl R. Pepmeier; David C. Burke; Allen P. Jones, all of Fredericksburg, Va.

[73] Assignee: FMC Corporation, Philadelphia, Pa.

[22] Filed: Apr. 26, 1972

[21] Appl. No.: 247,822

[52] U.S. Cl.............................73/150, 73/159
[51] Int. Cl...............................G01n 33/26
[58] Field of Search....................73/150, 159, 53, 73/58, 64.4, 104

[56] References Cited

UNITED STATES PATENTS

| | | | |
|---|---|---|---|
| 1,437,730 | 12/1922 | Eberly | 73/58 |
| 3,289,241 | 12/1966 | Garrison | 73/150 |
| 3,523,448 | 8/1970 | Rozellaar et al. | 73/104 |
| 3,618,374 | 11/1971 | Miller | 73/64.4 |

Primary Examiner—S. Clement Swisher
Attorney—Thomas R. O'Malley et al.

[57] ABSTRACT

Apparatus for determining the gravitational component of an angle at which a drop of liquid begins to flow down along a surface of a hydrophobic material as such material is urged into an inclined position, with the magnitude of such gravitational component serving as a measure of the expected adhesion of printing inks and other coatings to the surface of such hydrophobic materials.

6 Claims, 4 Drawing Figures

APPARATUS FOR DETERMINING COATING ADHESION PROPERTIES OF HYDROPHOBIC SURFACES

The present invention is concerned with an apparatus for measuring the expected adhesion of printing inks and other coatings to surfaces of hydrophobic materials.

Lacking in the art is a reliable and rapid means for determining the adhesion of printing inks and other coatings to hydrophobic materials, such as to surfaces of polypropylene and polyethylene films. For example, in the description of a standard method of test for Wetting Tension of Polyethylene and Polypropylene Films, ASTM Designation: D 2578-67, it is stated that it is possible to relate the wetting tension of a polyethylene or a polypropylene film surface to its ability to accept and retain inks, coatings, adhesives, etc. This same description, however, acknowledges that wetting tension in itself is not a completely acceptable measure of ink, coating or adhesive adhesion.

A primary object of this invention is the provision of a new or improved apparatus for use in measuring the expected adhesion of printing inks and other coatings to surfaces of hydrophobic materials.

Another object of this invention is the provision of an apparatus for rapidly and reliably measuring the expected adhesion of printing inks and other coatings to surfaces of hydrophobic materials.

Still another object is the provision of an apparatus which is simple in construction and use for measuring the expected adhesion of printing inks and other coatings to hydrophobic materials and particularly polypropylene films.

The above and other objects of this invention are achieved by an apparatus which includes a normally horizontally disposed table onto the uppermost surface of which may be disposed a sample of hydrophobic material which is to be tested. Means are provided for depositing a standard drop of liquid onto a sample surface adjacent to one edge of the table and for selectively pivoting such table at a substantially constant rate of speed about an axis which lies in the plane of the uppermost surface of this table. At the instant that the applied liquid starts to flow down the inclined film surface, the table pivoting means is inactivated and the table is retained in its inclined position. Included also is a scale, which is fixed adjacent to and relative to which the table is pivoted, for indicating the inclination of the table.

The means for pivoting the table includes a motor and a friction clutch between such motor and table. More specifically, the table is fixed at an end thereof which is remote from the one edge thereof, to a shaft, the longitudinal axis of which lies in the plane of the uppermost surface of such table. A friction clutch plate is fixed to this shaft and is turned through a disc of friction material which is snugly engaged with a gear which is rotatably mounted on this same shaft but is positively driven by the motor which is selectively energized by an operator through a suitable switch.

While de-energization of the motor is, of course, instantaneous, the inertia of the various members of the table pivoting means and the table itself may well provide for inflated and therefore erroneous results. Thus, to compensate for this effect a conventional friction brake is operatively engaged with the driven gear to arrest its movement and the members associated therewith substantially simultaneously with the deactivation of the motor.

Desirably, more than one drop of liquid is deposited onto the surface sample of hydrophobic material undergoing study. In the apparatus of the present invention this is achieved by burette which is supported for movement above the table along a path which is substantially parallel to the pivot axis of the table. The burette supporting means is hinged to permit the same to be pivoted to and away from a position above such table. Valves are provided for controlling the delivery of liquid to the burette and the rate at which drops of liquid are deposited upon the material being tested.

As heretofore mentioned, the apparatus of the present invention facilitates the determination of the gravitational component of an angle at which a drop of liquid begins to flow down along a surface of a hydrophobic material as such material is urged into an inclined position, with the magnitude of such gravitational component serving as a measure of the expected adhesion of printing inks and other coatings to the surface of such hydrophobic material. Stated differently, the greater the angle to which a hydrophobic material is inclined before a drop of liquid on its surface starts to flow, the greater is the tendency for such material to retain printing inks and other coatings.

In the method practiced with the apparatus of the present invention, the table is placed in a horizontal position and a hydrophobic material, such as an uncoated polypropylene film, is applied to its surface and, if necessary, attached thereto, as with tape. One and preferably a plurality of equally spaced standard drops of liquid, preferably distilled water, are then deposited upon the exposed surface of the material being tested along a line substantially parallel to the pivot axis of the table.

The drive motor is then set into operation to elevate the table about its pivot axis at a uniform rate of speed; that is, without erratic motion which may jar the applied water drops. Operation of the drive motor is continued until the drop of water or a selected number of a plurality of such water drops, as for example, two or three of a total of five drops, commence to flow down the inclined material. At this instant, the motor is stopped, with the friction brake simultaneously arresting the movement of the other members of the drive system and retaining the table and attached sample in their inclined positions. The scale fixed adjacent to the path of table movement is calibrated to indicate the angle subtended by the surface of the material being tested and a horizontal plane passing through the pivot axis. As heretofore mentioned, the larger the angle through which the test material is carried before liquid flow along its surface is experienced, the greater is its tendency to retain ink and other coatings.

With polypropylene films, subtended angles having tangent values of 1.0 or greater usually exhibit good ink and other coating retention, while tangent values of less than 0.40 show poor printing ink and other coating adhesion. Tangent values between 0.40 and 1.0 provide marginal adhesion of printing inks and other coatings.

The apparatus of the present invention is particularly well adapted for use with flexible hydrophobic film or sheet materials but can also be employed with hydrophobic materials in rigid form, as for example, panels, tiles or the like. While the described apparatus is applicable for use with hydrophilic materials which have been surface treated, as for example, by flame or corona discharge, satisfactory results are not achieved with hydrophilic materials, such as cellophane. Further, since the mechanics of adhesion of printing inks and other coatings to materials having hydrophobic coatings can be quite different from that involved with uncoated hydrophobic materials, the apparatus of the present invention is not generally recommended for use with such precoated materials.

Figure 1:
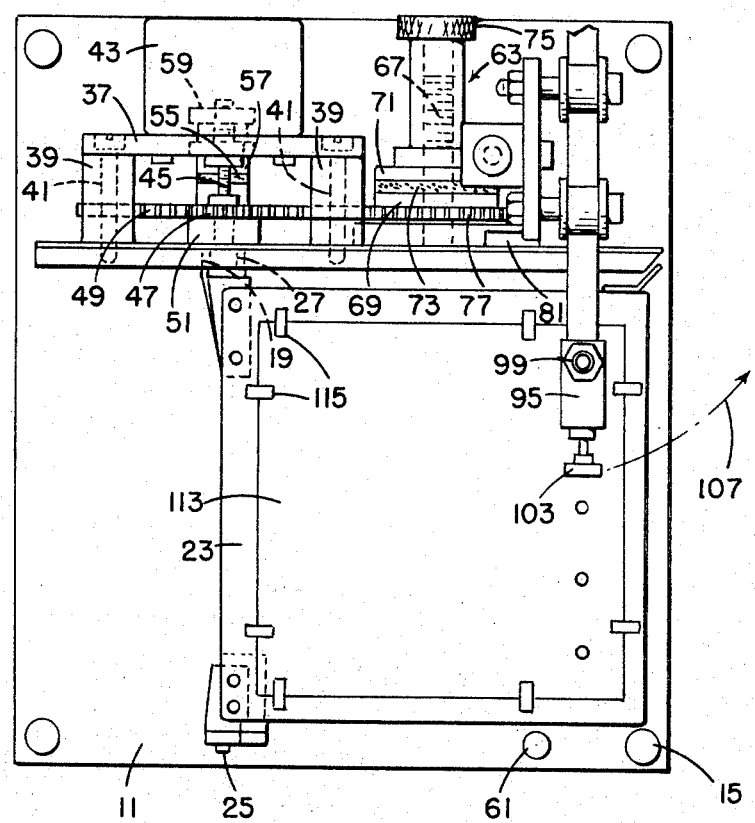
FIG. 1 is a plan view of the apparatus of the present invention.
Figure 2:
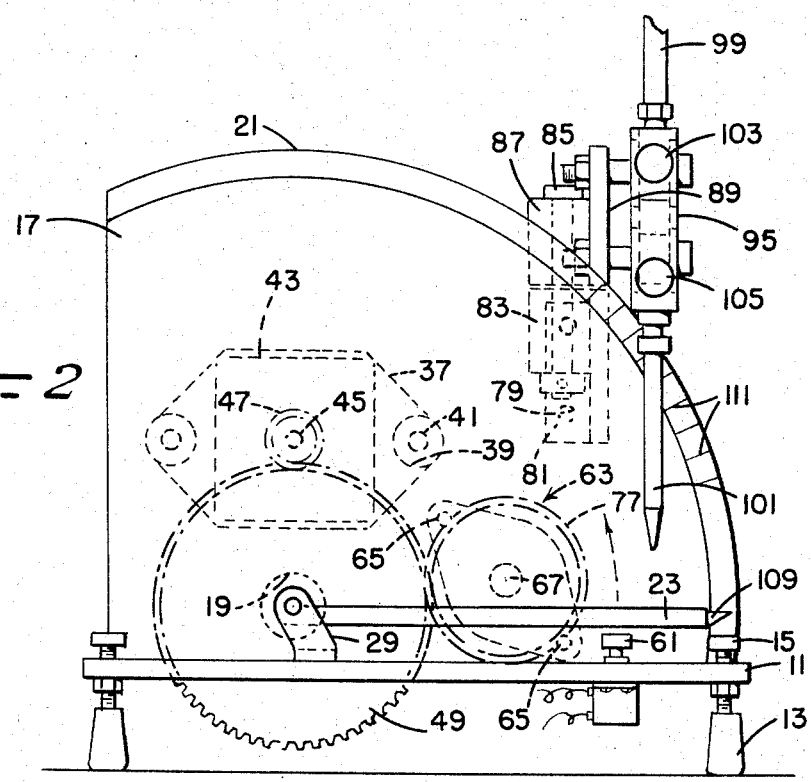
FIG. 2 is a side view of the apparatus shown in FIG. 1.

Referring to FIGS. 1 and 2 of the drawing, the apparatus of the present invention includes a base plate 11 which is supported in a horizontal plane by legs 13 and leveling screws 15 at each of the corners thereof. Fixed at right angles to the top face of the base plate 11 is a wall 17 having an opening 19 extending therethrough and an arcuate edge 21 which is concentric with such opening 19.

Figure 4:
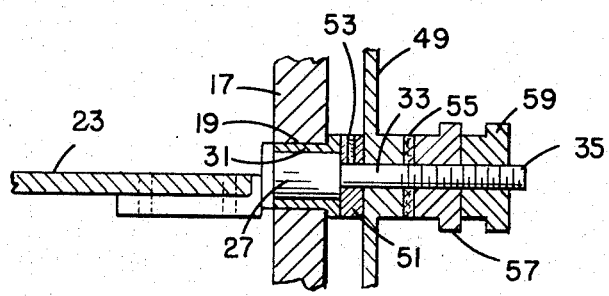
FIG. 4 is a fragmentary section of a friction clutch of the apparatus shown in FIG. 1.

A table 23 is disposed to one side of the wall 17 and has rock shafts 25 and 27 fixed to one end thereof with their axes being aligned and lying the plane of the uppermost surface of the table 23. The shaft 25 is pivotally carried by an angle bearing 29 which is secured to the base plate 11. As best shown in FIG. 4, the shaft 27 extends through a flanged bushing 31, seated within the wall opening 19, and is formed with a shank 33 having threads 35 adjacent to its free end.

As shown in FIG. 1 and 2, suspended from the wall 17 by means of plate 37, spacers 39, and bolts 41 is an electric motor 43 having a drive shaft 45 to which is fixed a spur gear 47. A much larger spur gear 49 meshes with the gear 47 and is rotatably mounted on the shank 33. As illustrated in FIG. 4, a spacer 51 is fixed by a set screw 53 to the shank 33 inbetween the bushing flange and the gear 49 to maintain the latter in proper alignment with the gear 47.

Rotary motion imparted by the gear 47 to the gear 49 is transmitted to shank 33 and shaft 27 through a friction clutch which includes a disc 55 of friction material, such as leather or felt, held snugly against the hub of the gear 49 by nuts 57 and 59 which are threaded onto the shank 33. Both of the nuts 57 and 59 are adjusted to provide the desired pressure on the friction disc 55, with the nut 59 serving to lock the nut 57 in its adjusted position.

The motor 43 is connected to a suitable source of electricity through a switch 61 which effects operation of the motor 43 only when held in depressed position. While a release of the switch 61 from its depressed position stops the supply of electricity to the motor 43, the inertia of the different elements of the drive system would normally effect a continued, though limited, rotation of the shaft 27 and movement of the table 23 which is attached thereto.

To avoid this effect the apparatus of the present invention employs a conventional friction brake which is indicated generally at 63. This brake 63 is fixed by bolts 65 to the wall 17 and includes a spindle 67, pressure discs 69 and 71, a friction disc 73 formed of leather or felt or other like material, and an adjusting nut 75. The pressure disc 69 is rotatably mounted on the spindle 67 and is provided along its periphery with teeth 77 which mesh with the spur gear 49. Motion imparted to the spur gear 49 by the motor 43 will, of course, be transmitted by such gear to the disc 69.

The friction disc 73 is urged snugly against the disc 69 by the pressure disc 71 which is adjusted into desired position by the net 75 and then locked to the spindle 67, as with a set screw. Thus, when the motor 43 is de-energized, the friction disc 73 serves to retard the plate 69 as well as the spur gear 49 which is in meshing engagement therewith.

Figure 3:
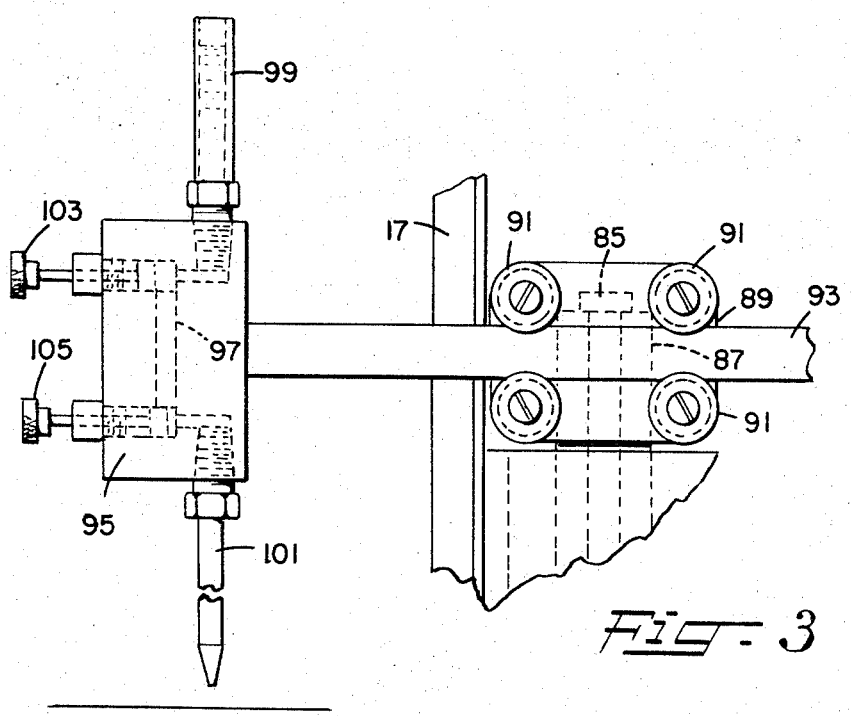
FIG. 3 is a side view of a portion of the apparatus shown in FIG. 1.

Fixed at 79, to wall 17 is an angle 81 to which is secured a hinge block 83. Pivotally connected to the block 83 by a pin 85 is a similar hinge block 87 to which is attached a plate 89. As best shown in FIG. 3, guide rollers 91 project from the plate 89 and support a slide rod 93 on one end of which is carried a valve block 95 having a flow passage 97 as indicated in broken lines. A liquid container 99 and burette 101 are fixed to the valve block 95 at the upper and lower ends, respectively, of the flow passage 97. Carried also by the valve block 95 is a valve 103 for regulating the flow of liquid from the container 99 and a similar valve 105 which facilitates control over the rate at which drops of liquid issue from the burette 101.

The slide rod 93, when positioned as shown in FIGS. 1-3, is disposed substantially parallel to the axes of the rock shafts 25 and 27. Thus drops of liquid issuing from the burette 101 during movement of the slide rod 93 across the table 23 will all lie equal distances from the axes of such rock shafts 25 and 27. Suitable stops, not illustrated, may be provided on the slide rod 93 to limit its movement to such distance as spans the table 23. Once liquid deposition is achieved, the valve block 95 and its supporting means may be swung out away from the path of movement of the table 23 as indicated by the arrow 107 in FIG. 1.

Projecting from the free end of the table 23, at the corner thereof nearest to the wall 17, is a pointer 109 which cooperates with scale 111 provided adjacent to the edge 21 of the wall 17 to indicate the degree of inclination of the table 23 during the individual testing thereof.

In the operation of the above described apparatus with the table 23 is its lowermost, horizontal position and the valve block 95 being swung out away from such table, a hydrophobic material, such as a polypropylene film 113, is placed on the uppermost surface of the table and, if necessary, fixed by adhesive tape 115. Valve 103 is then opened to permit liquid, preferably distilled water, to pass from the container 99 into the flow passage 97, afterwhich the valve 105 is adjusted to control the rate at which drops of such liquid issue from the burette 101. The valve block 95 is then positioned as shown in FIGS. 1 and 2 and the slide rod 93 is moved manually across the table 23 to deposit a series of drops of liquid onto the surface 113 at approximately equal spacing therebetween. Once this water deposition is completed the slide rod 93 is moved in the direction of the arrow 107 away from the path of the table 23.

The switch 101 is then depressed to actuate the motor 43 and held in its depressed position to effect continuous elevation of the table 23 about the axes rock shafts 25 and 27. Once one or other of a predetermined number of water drops starts to flow down the film 113, the switch 61 is released whereby the friction brake 63 simultaneously arrests the movement of the gear 49 and retains the table 23 in its inclined position. The scale reading 111 opposite the pointer 109 will indicate, for example, the angle to which the table 23 has been inclined at the instant flow of one or more of the water drops was experienced.

It is to be understood that changes and variations may be made without departing from the spirit and scope of the invention as defined in the appended claims.

We claim:

1. Apparatus for measuring the expected adhesion of printing inks and other coatings to surfaces of hydrophobic material including a normally horizontally disposed table onto the uppermost surface of which may be disposed a sample of hydrophobic material which is to be tested, means for depositing a drop of liquid onto a sample surface adjacent to one edge of said table, means for selectively pivoting said table at a substantially constant rate of speed about an axis which lies in the plane of the uppermost surface of said table, means for retaining said table in its inclined position when said pivoting means is rendered inactive, and a fixed scale for indicating the inclination of said table after the pivoting thereof.

2. Apparatus as defined in claim 1 wherein said means for pivoting said table includes a motor and a friction clutch between said motor and table.

3. Apparatus as defined in claim 1 wherein said means for pivoting said table include a shaft fixed to an end of said table remote from said one edge, a gear rotatably mounted on said shaft, a motor for positively driving said gear, means for selectively operating said motor, and a friction clutch between said gear and said shaft.

4. Apparatus as defined in claim 3 wherein said retaining means as a friction brake engaged with said gear for arresting the movement thereof simultaneously as said motor is rendered inactive.

5. Apparatus as defined in claim 1 wherein said means for depositing liquid includes a burette, means supporting said burette for movement above said table along a path substantially parallel to the pivot axis of said table, and means for regulating the flow of liquid from said burette whereby a plurality of like spaced drops of liquid may be deposited on the sample surface during movement of said burette along its supporting means.

6. Apparatus as defined in claim 5 further including hinge means for pivoting said burette supporting means to and away from a position above said table.

* * * * *